(12) United States Patent
Zhou

(10) Patent No.: US 6,807,067 B2
(45) Date of Patent: Oct. 19, 2004

(54) BATTERY-LOCKING MECHANISM

(75) Inventor: YongHeng Zhou, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/600,402

(22) Filed: Jun. 20, 2003

(65) Prior Publication Data
US 2004/0145872 A1 Jul. 29, 2004

(30) Foreign Application Priority Data

Jan. 29, 2003 (TW) .......................................... 92201637

(51) Int. Cl.$^7$ ................................................ H05K 5/02
(52) U.S. Cl. ....................... 361/814; 361/759; 361/754; 439/862; 439/133.1
(58) Field of Search ............................. 361/814, 801, 361/759, 740, 752, 726, 747, 754; 439/862, 733.1

(56) References Cited

U.S. PATENT DOCUMENTS

| 5,436,088 | A | * | 7/1995 | Castaneda et al. ............ 429/96 |
| 5,746,626 | A | * | 5/1998 | Kwiat et al. ................. 439/630 |
| 5,933,330 | A | | 8/1999 | Beutler et al. |
| 6,022,248 | A | * | 2/2000 | Wu et al. .................... 439/862 |
| 6,157,545 | A | | 12/2000 | Janninck et al. |

* cited by examiner

Primary Examiner—Randy Gibson
Assistant Examiner—Hung Bui
(74) Attorney, Agent, or Firm—Wei Te Chung

(57) ABSTRACT

A battery-locking mechanism for securing a battery (60) having an upper end in a portable electronic device (1) includes a plurality of spring members (50) which are received in a plurality of receptacles (28) defined by a plurality of partition walls. A battery-receiving compartment (24) is defined by an upper wall (242), a lower wall (246), and a bottom (248). A plurality of apertures (2422) is defined through the upper wall. Each receptacle is located adjacent to the upper wall and is in communication with the aperture. Each spring member includes a base portion (52) and an elastic portion (54). A free end of the elastic portion extends to the aperture. A tab protrudes from the upper end of the battery, extending into the aperture when the battery is arranged into the battery-receiving compartment, and the spring element then presses against the tab of the battery. The battery is thus secured in the battery-receiving compartment of the portable electronic device.

12 Claims, 9 Drawing Sheets

BATTERY-LOCKING MECHANISM

BACKGROUND OF THE INVENTION

1. Field of the Invention

This invention generally relates to a battery-locking mechanism for holding a battery in a portable electronic device.

2. Prior Art

Portable electronic devices, such as mobile phones and personal digital assistants, need batteries to provide power for their operation. To secure the batteries in battery-receiving compartments of the portable electronic devices, battery-locking mechanisms are developed and designed.

A conventional battery-locking mechanism for holding a battery package in a battery-receiving compartment of an electronic device includes a plurality of projections on a front end and a rear end of the battery package, and a plurality of notches defined in a top inner wall and a bottom inner wall of the battery-receiving compartment. The projections on the front end are integrally formed with a button on an outside surface of the battery package. During assembly of the battery package within the battery-receiving compartment, the projections on the rear end are first inserted into the notches in the bottom inner wall. When the button is pulled rearwardly, the button pulls the projections on the front end rearwardly. The projections are aligned with the notches in the top inner wall of the battery-receiving compartment. Next, the button is released, and the projections on the front end are then received in the notches in the top inner wall. The battery package is thus secured in the battery-receiving compartment.

To remove the battery package from the battery-receiving compartment, the button is pulled rearwardly. The projections on the front end of the battery package are also pulled together with the button and withdraw from the notches in the top inner wall of the battery-receiving compartment. Next, the battery package is raised and then taken out of the battery-receiving compartment. However, since the projections with the button are generally made of hard plastic materials, the projections have a poor elasticity and they are susceptible to being damaged. If the projections are damaged, the battery package may fail to electrically connect with the mobile phone. U.S. Pat. No. 6,157,545 discloses a battery connection apparatus of a mobile phone. The battery connection apparatus includes springs and receptacles in a rear housing for receiving the springs. The springs comprise front arms and rear arms. Each front arm has a mounting surface having a locking tooth. When each spring is assembled into each receptacle, the locking tooth interferes with an inner wall of the receptacle. The spring is thus secured in the receptacle.

However, since the front arm does not provide adequate flexibility, too much interfering force is exerted on the inner wall of the receptacle when the front arm is inserted into the receptacle. Therefore, the inner wall of the receptacle is susceptible to being damaged after a long period of usage. Then, the engagement between the front arm of the spring and the inner wall of the receptacle will degrade, which can lead to the battery failing to be secured firmly in the battery-receiving compartment of the mobile phone. As a result, abrupt electrical disconnection can happen during conversations, which is very troublesome.

SUMMARY OF THE INVENTION

Accordingly, an object of the present invention is to provide a battery-locking mechanism for firmly securing a battery in an electronic device, therefore assuring reliable electrical connection between the battery and the electronic device.

To achieve the above-mentioned object, a battery-locking mechanism for securing a battery having an upper end in a portable electronic device includes a plurality of spring members which are received in a plurality of receptacles defined by a plurality of partition walls. A battery-receiving compartment is defined by an upper wall, a lower wall, and a bottom. A plurality of apertures is defined through the upper wall. Each receptacle is located adjacent to the upper wall and is in communication with the aperture. Each spring member includes a base portion and an elastic portion, A free end of the elastic portion extends to the aperture. A tab protrudes from the upper end of the battery, extending into the aperture when the battery is arranged into the battery-receiving compartment, and the spring element then presses against the tab of the battery. The battery is thus secured in the battery-receiving compartment of the portable electronic device.

Other objects, advantages and novel features of the present invention will be drawn from the following detailed description of preferred embodiments of the present invention, in which:

DETAILED DESCRIPTION OF THE INVENTION

Figure 1:
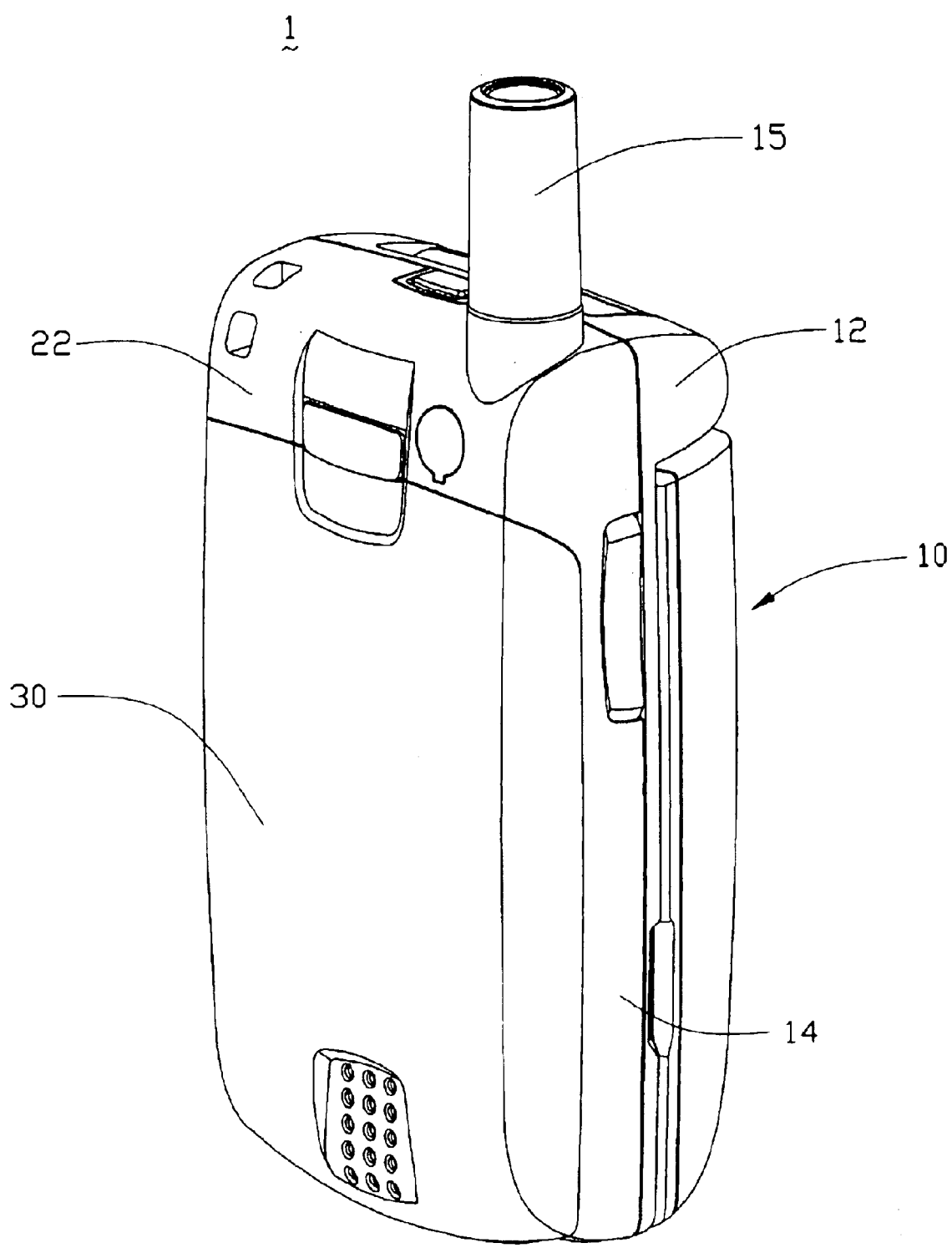
FIG. 1 is a perspective view of a mobile phone, which shows a back side of the mobile phone.
Figure 2:
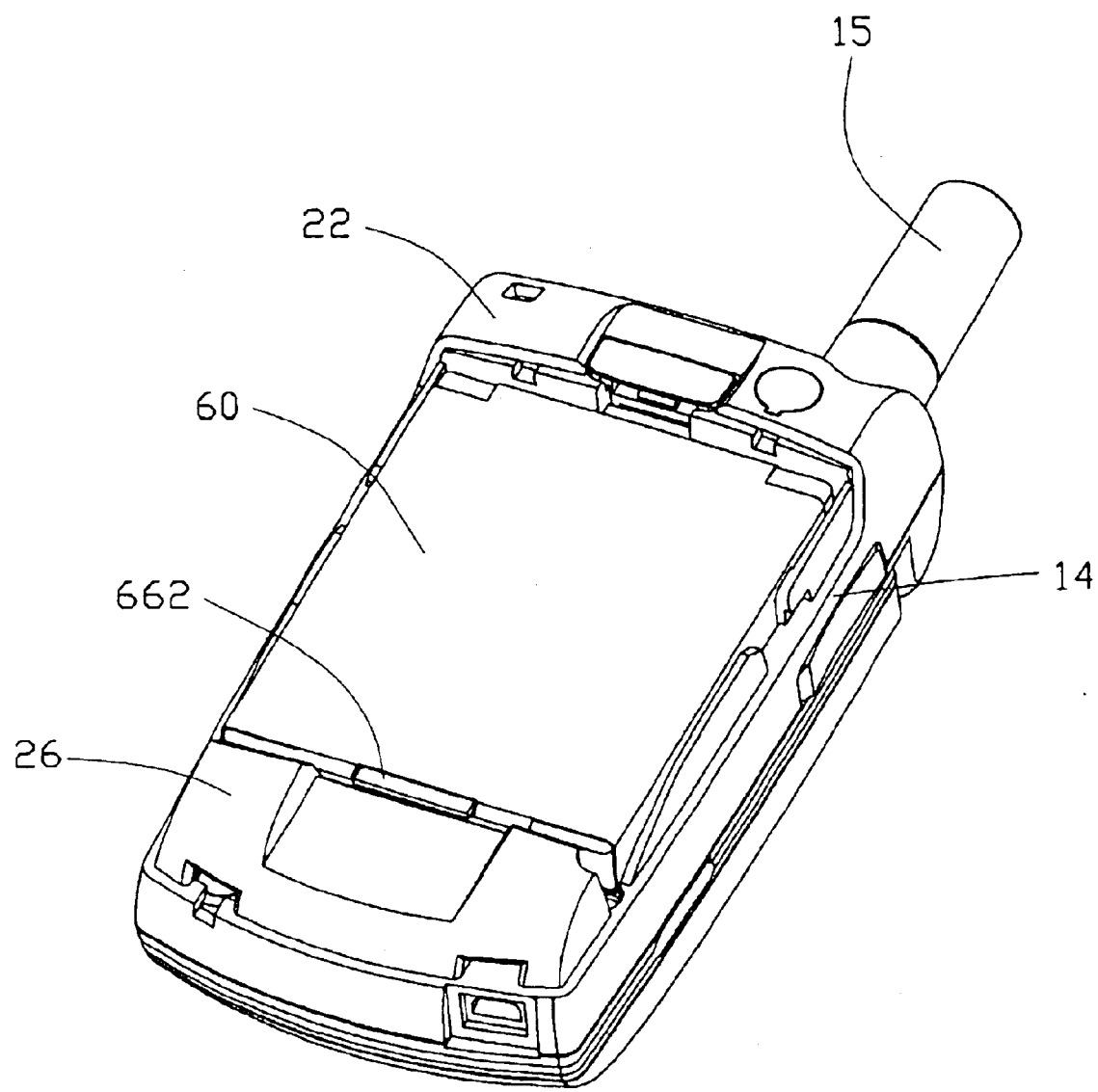
FIG. 2 is a perspective view of the mobile phone of FIG. 1 with a battery cover removed.

Referring to FIG. 1, a foldable mobile phone 1 here is taken as an example for the purpose of explanation of the present invention. The mobile phone 1 comprises an enclosure 10, a printed circuit board (not shown) received therein, an antenna 15, a battery 60 (shown in FIG. 2) and a battery cover 30 covering the battery 60. The enclosure 10 comprises a front housing 12 and a rear housing 14.

Figure 3:
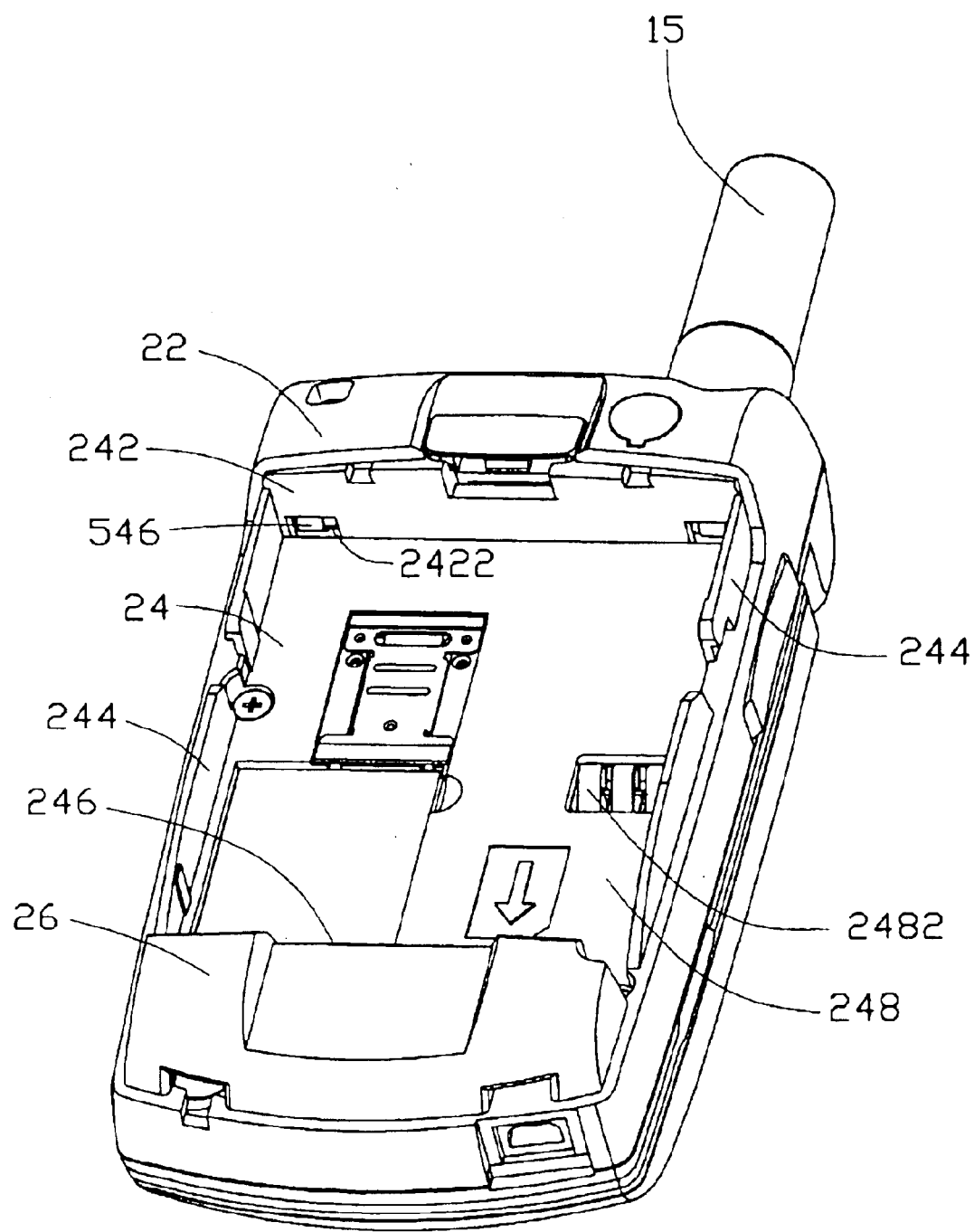
FIG. 3 is a perspective view of the mobile phone of FIG. 2 with a battery removed.
Figure 4:
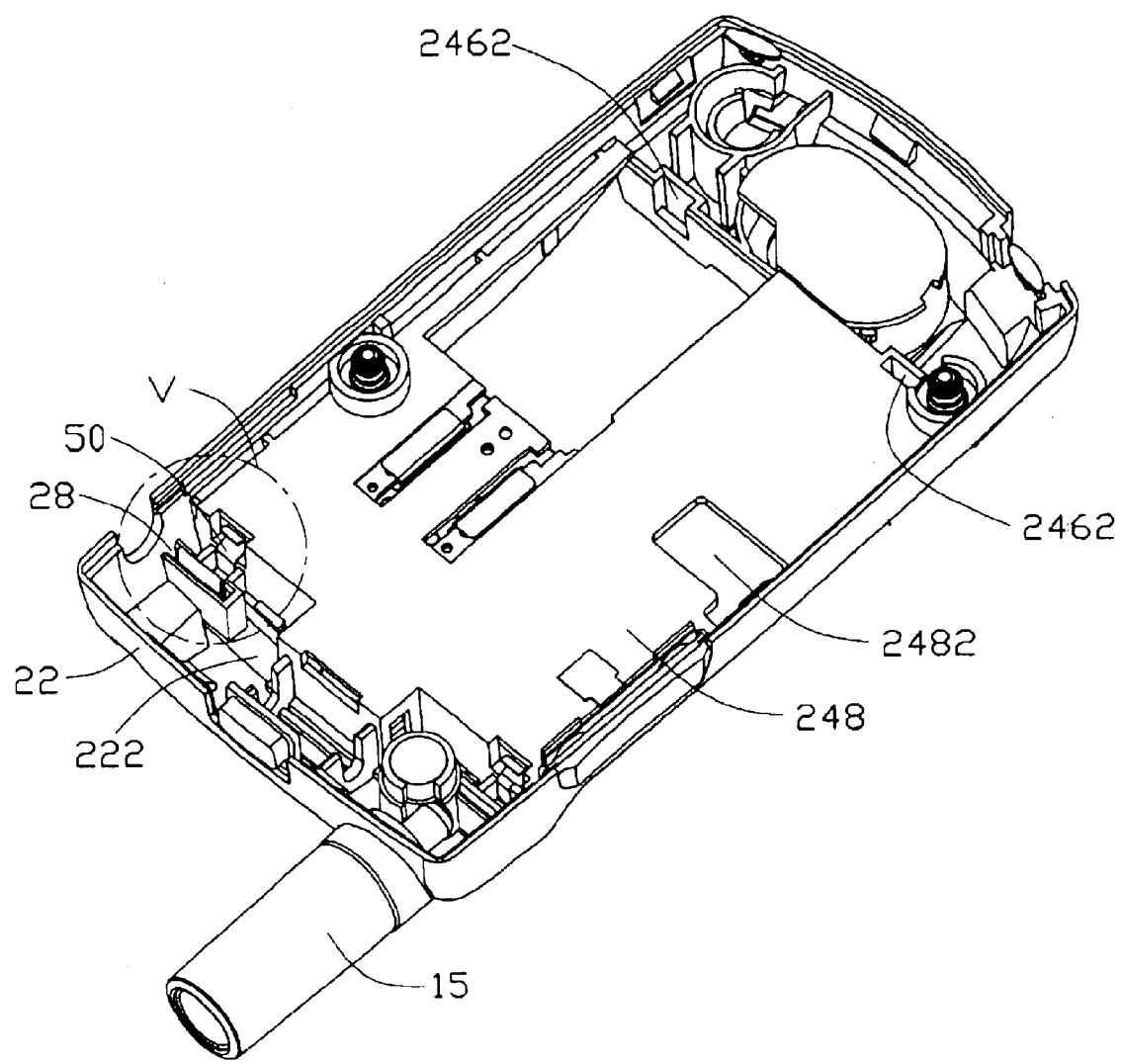
FIG. 4 is a perspective view of a rear housing of the mobile phone, wherein a battery-locking mechanism is shown in a circular broken line V.
Figure 6:
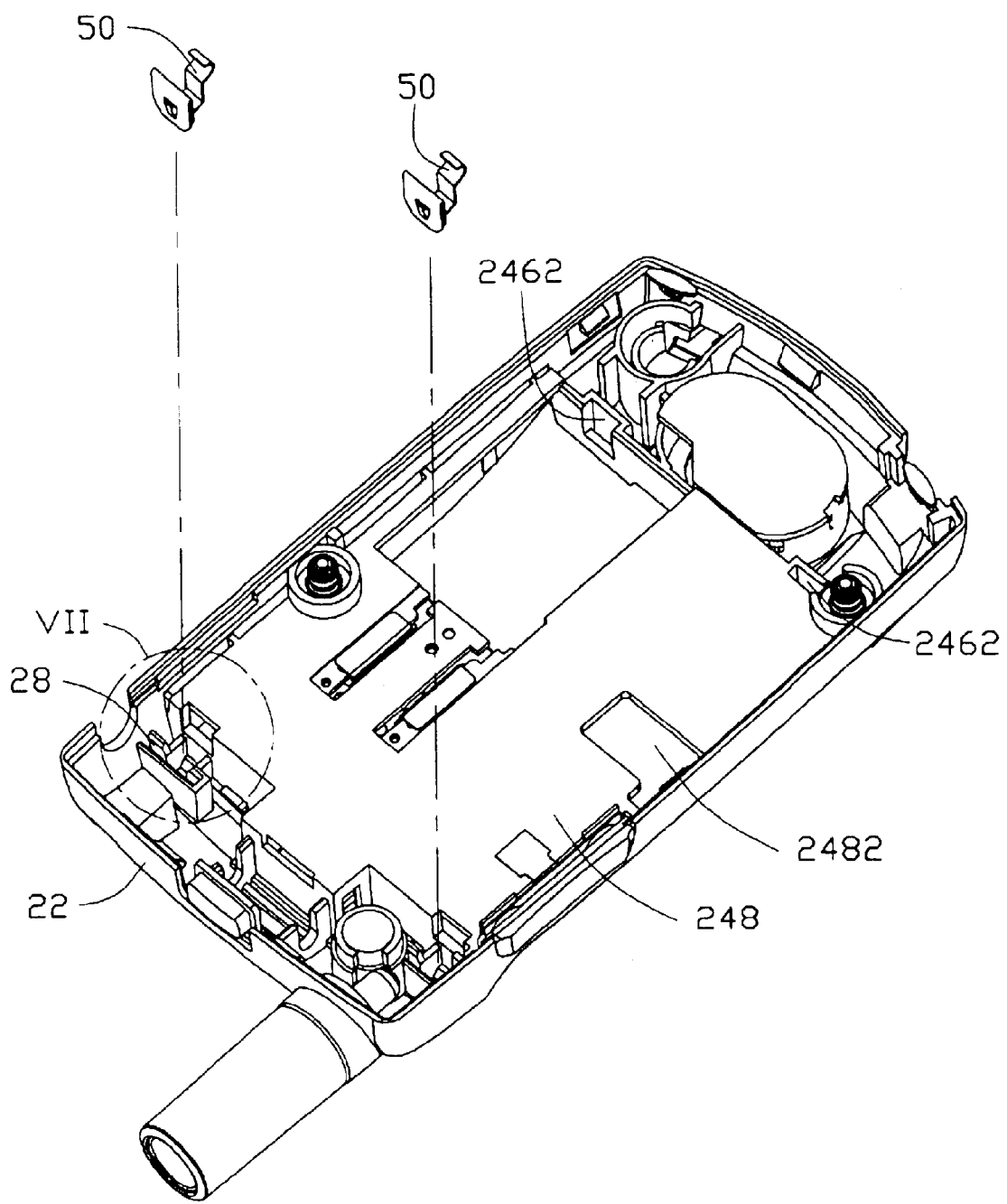
FIG. 6 is an exploded, perspective view of the battery-locking mechanism of the present invention.

Referring to FIGS. 3, 4 and 6, a battery-locking mechanism attached in the rear housing 14 according to a preferred embodiment of the present invention comprises a plurality of spring members 50 which are received in a plurality of receiving receptacles 28 located adjacent a battery-receiving compartment 24. The receiving receptacles 28 receive the spring members 50, respectively. The spring members 50 abut against the battery 60 and secure the battery 60 in the battery-receiving compartment 24 under the action of elastic force.

The battery-receiving compartment 24 is defined between a top portion 22 and a bottom portion 26 of the mobile phone 1 to accommodate the battery 60. The battery-receiving compartment 24 is defined by a top wall 242, a pair of opposite sidewalls 244, a bottom wall 246, and a bottom 248. A pair of receiving slots 2422 adjacent to the bottom 248 is defined in two opposite sides of the top wall 242. A pair of receiving grooves 2462 is defined in two opposite sides of the bottom wall 246. An opening 2482 is formed in the bottom 248 for receiving a plurality of terminals (not labeled).

Figure 5:
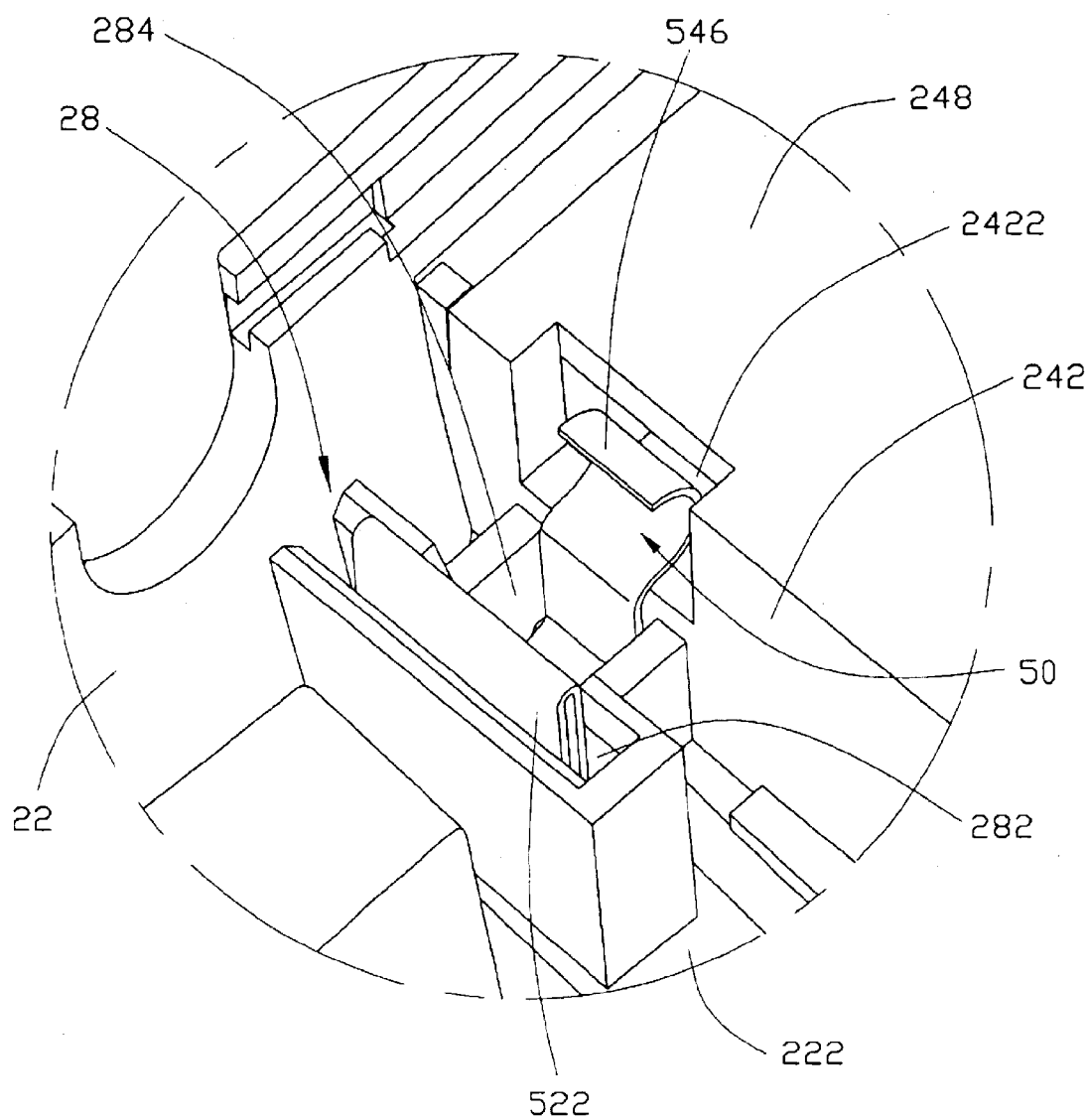
FIG. 5 is an enlarged view of the battery-locking mechanism shown in the circular broken line V of FIG. 4.
Figure 7:
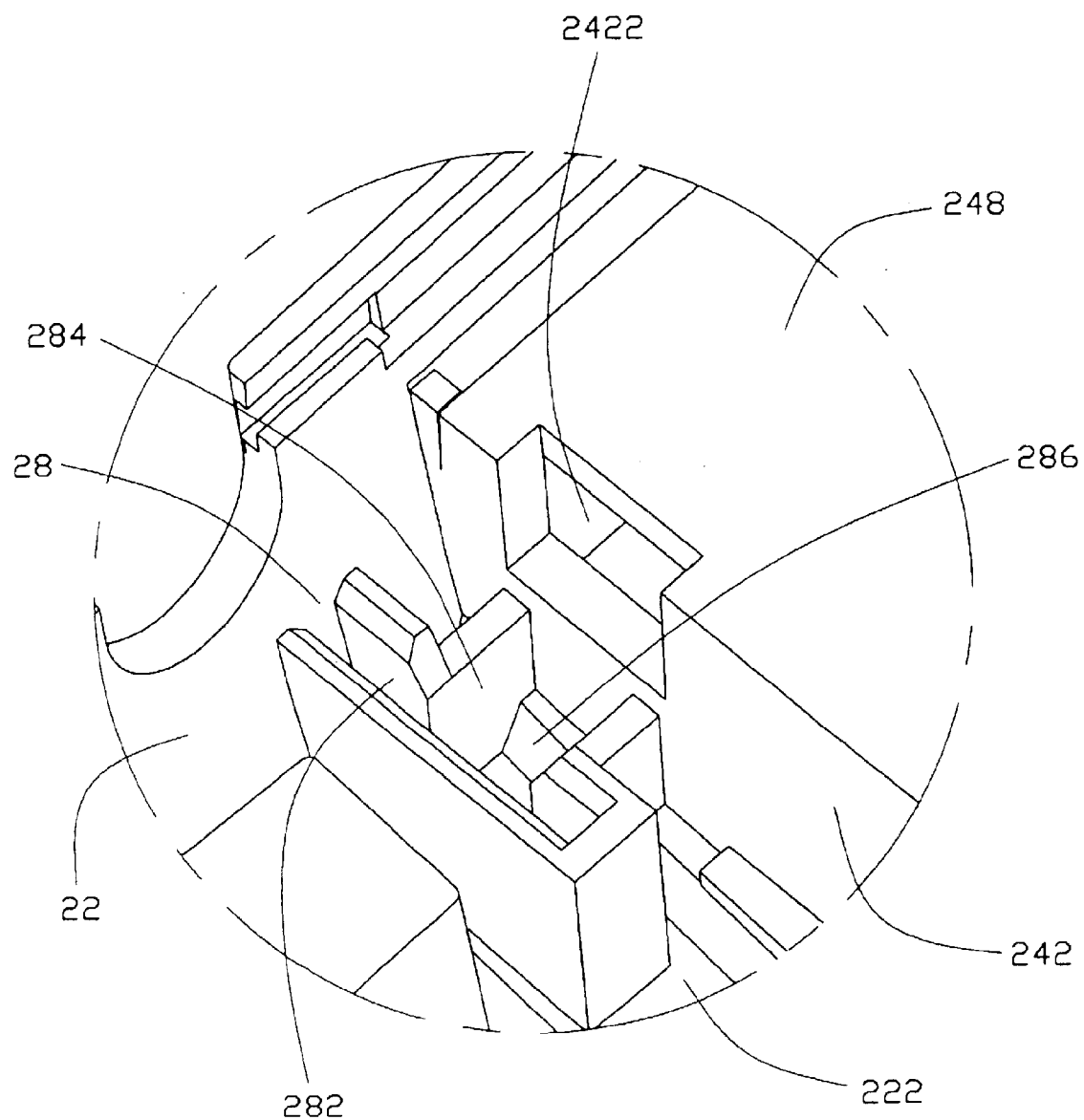
FIG. 7 is an enlarged view of a receptacle of the battery-locking mechanism shown in a circular broken line VII of FIG. 6.

Referring to FIGS. 5 and 7, each receiving receptacle 28 is formed in the top portion 22 of the mobile phone 1. Each receiving receptacle 28 is defined by several sidewalls (not labeled) protruding from a bottom surface 222 of a back side of the rear housing 14, near to the top wall 242. Each receiving receptacle 28 is in a position corresponding to a corresponding receiving slot 2422 in the top wall 242. Each receiving receptacle 28 comprises a first notch 282 and a second notch 284. The first notch 282 communicates with the second notch 284. The first notch 282 is parallel to the top wall 242. The second notch 284 is perpendicular and adjacent to the top wall 242. A shoulder 286 extends from the bottom surface 222 into the second notch 284.

Figure 8:
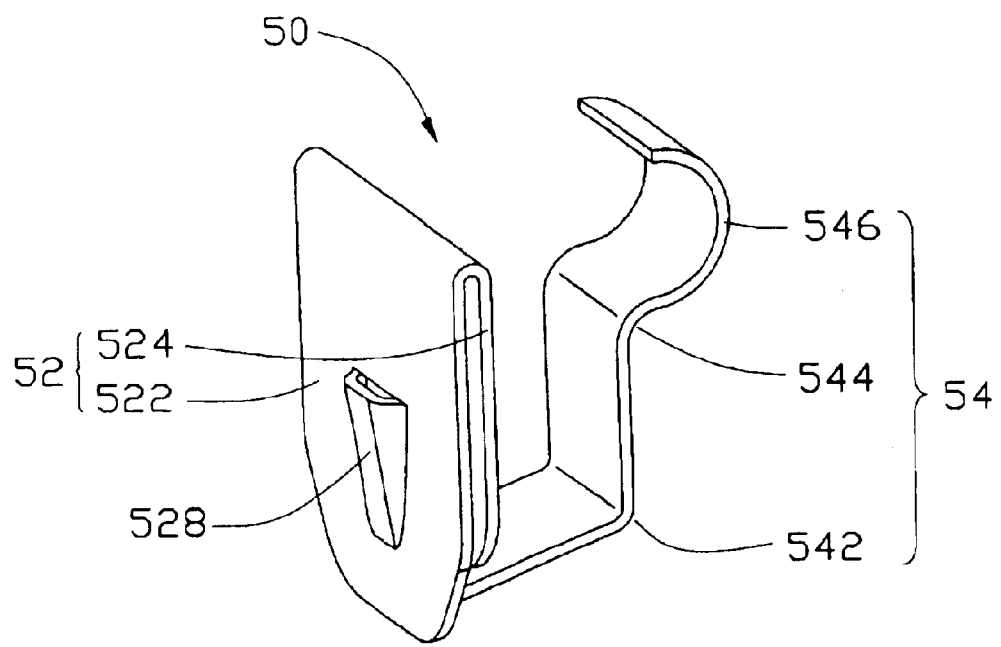
FIG. 8 is a perspective view of a spring member of the battery-locking mechanism of FIG. 6.
Figure 9:
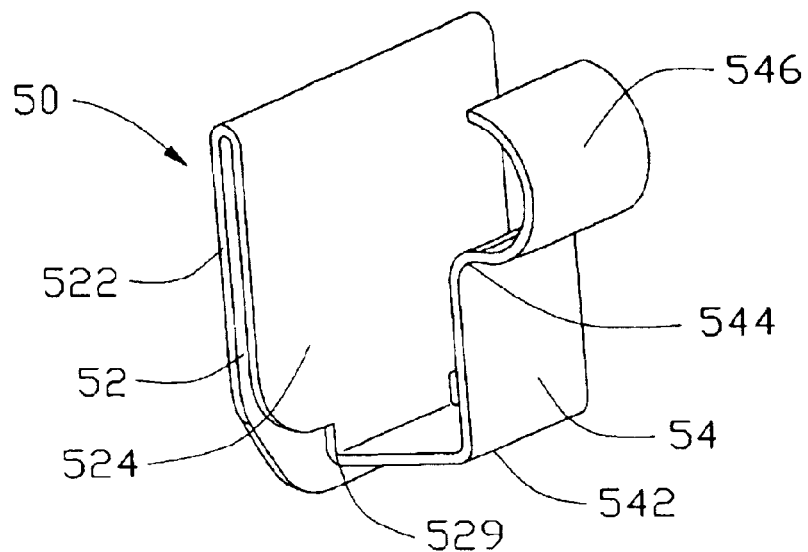
FIG. 9 is another perspective view of the spring member of FIG. 8.

Referring to FIGS. 8 and 9, each spring member 50 can be made of metal or other elastic materials, Each spring member 50 comprises a base portion 52 and an elastic portion 54. The base portion 52 comprises a first panel 522 and a second panel 524. The first panel 522 is integrally formed with the second panel 524, the two together forming a "U" shape. A nose-shaped projection 528 having a slant surface (not labeled) protrudes from an outside surface (not labeled) of the first panel 522. The elastic portion 54 extends from a bottom end 529 of the second panel 524. The elastic portion 54 is bent to form a first folded part 542, a second folded part 544, and a contact part 546 having a semicylindrical shape.

To assemble a spring member 50 into its corresponding receiving receptacle 28, the base portion 52 is inserted into the first notch 282 of the receiving receptacle 28 along the slant surface of the nose-shaped projection 528, and the bottom end 529 and the first folded part 542 of the second panel 524 are then pressed against the bottom of the second notch 284. The second folded part 544 sits over the shoulder 286 protruding from the bottom of the second notch 284. The contact part 546 extends into the receiving slot 2422 of the top wall 242. The contact part 546 can rotate about the shoulder 286 as an axis. It is easy to insert the base portion 52 into the first notch 282, while more strength is required to pull the base portion 52 out of the first notch 282. Therefore, the spring member 50 is firmly secured in the receiving receptacle 28.

Figure 10:
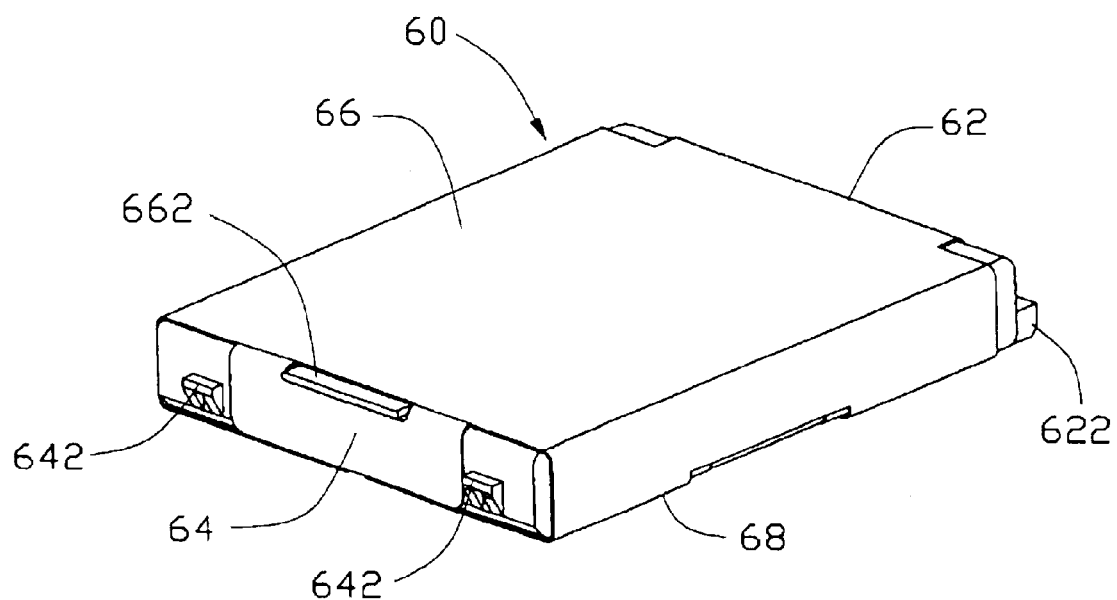
FIG. 10 is a perspective view of the battery used in the mobile phone of FIG. 1.
Figure 11:
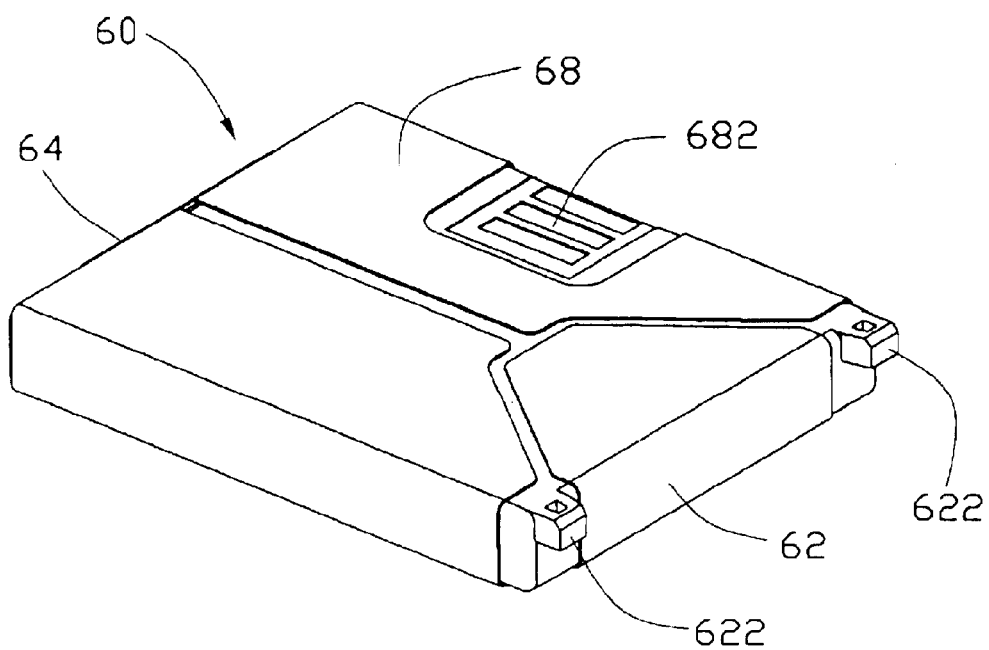
FIG. 11 is another perspective view of the battery of FIG. 10, wherein a back side of the battery is shown.

Referring to FIGS. 10 and 11, the battery 60 is rectangular and comprises a top end 62, a bottom end 64, an upper side 66, and a lower side 68. A pair of protrusions 622 protrudes from two opposite sides of the top end 62. A pair of wedges 642 is formed on two sides of the bottom end 64. A handle 662 extends from a point where the upper side 66 intersects the bottom end 64. A plurality of contact pads 682 is arranged on the lower side 68.

To assembly the battery 60 in the battery-receiving compartment 24, the top end 62 of the battery 60 is pressed against the top wall 242 of the battery-receiving compartment 24. The protrusions 622 are inserted into the receiving slots 2422 and abut against the contact parts 546 of the spring members 50. The battery 60 is then pressed down until the wedges 642 are finally received in the receiving grooves 2462 of the bottom wall 246 of the battery-receiving compartment 24. The battery 60 is thus received and firmly secured by the spring member 50 in the battery-receiving compartment 24. The contact pads 682 electrically connect with the terminals in the opening 2482 after the battery 60 is mounted in the mobile phone 1, since the contact pads 682 are in a position corresponding to the position of the opening 2482.

To remove the battery 60, a force is exerted on the handle 662 along a direction toward the top end 62 of the battery 60. The protrusions 622 push the contact parts 546 of the spring members 50 compressively and the wedges 642 disengage from the receiving slots 2462. The battery 60 can then be drawn out of the battery-receiving compartment 24.

The battery locking mechanism of the present invention has a spring member 50 having a base portion 52 comprising the first panel 522 and the second panel 524. Since the first panel 522 is integrally and flexibly formed with the second panel 524 at an end thereof, the spring member 50 provides more flexibility and reduces a risk of destroying the receiving receptacle 28 by using too much interfering force exerted on the inner wall of the receiving receptacle 28. Since a secure connection between the battery and the mobile phone is maintained over a long period of time, reliable electrical connection is thus assured and abrupt interruptions of power are avoided.

It is believed that the present invention and its advantages will be understood from the foregoing description and it will be apparent that various changes may be made thereto without departing from the spirit and scope of the invention or sacrificing all of its material advantages, the example hereinbefore described merely being a preferred or exemplary embodiment of the invention.

I claim:

1. A battery-locking mechanism to secure a battery having an upper end in a portable electronic device, comprising:
   a battery-receiving compartment having an upper wall and a lower wall, an aperture being defined through the upper wall;
   a plurality of partition walls defining a receptacle located outside the battery-receiving compartment and in communication with the aperture, the receptacle being divided into a first notch and a second notch; and
   a spring element including a base portion and an elastic portion, the base portion being securely received in the first notch of the receptacle, the elastic portion being received in the second notch, and a free end of the elastic portion substantially extending to the aperture;
   wherein the base portion comprises a first panel and a second panel, the fiat panel is connected with the second panel at an end thereof, and a nose-shaped projection is formed on an outside surface of the first panel; and
   a tab protrudes from the upper end of the battery, and extends into the aperture when the battery is arranged into the battery-receiving compartment, the spring element then pressing against the tab of the battery.

2. The battery-locking mechanism of claim 1, wherein the elastic portion extends from a bottom end of the second panel.

3. The battery-locking mechanism of claim 2, wherein the elastic portion comprises a first folded part, a second folded part, and a contact part.

4. The battery-locking mechanism of claim 3, wherein the contact part has a semicylindrical shape which is positioned adjacent to the corresponding aperture.

5. The battery-locking mechanism of claim 4, wherein a shoulder extends from a bottom of the second notch and the first folded part sit on the shoulder.

6. A battery-locking mechanism to secure a battery having an end in a portable electronic device, comprising:
   a battery-receiving compartment being defined by several sidewalls and a bottom, at least an aperture being defined through one of the sidewalls; and
   at least an elastic securing means, comprising a fixed end portion and a free end portion, the elastic securing means being received within a housing of the portable electronic device with the free end portion substantially extending to the aperture;
   wherein a tab protrudes from the end of the battery, and extends into the aperture when the battery is arranged into the battery-receiving compartment, the free end portion of the elastic securing means then pressing against the tab of the battery; and
   the fixed end portion comprises a first panel and a second panel, the first panel is integrally and flexibly formed with the second panel, the free end portion of the elastic securing means extends from a bottom end of the second panel, and a nose-shaped projection is ford on an outside surface of the first panel.

7. The battery-locking mechanism of claim 6, wherein the free end portion comprises a first folded part, a second folded part, and a contact part.

8. The battery-locking mechanism of claim 7, wherein a receptacle is defined outside the battery-receiving compartment and in communication with the aperture.

9. The battery-locking mechanism of claim 8, wherein the receptacle is divided into a first notch and a second notch perpendicular to the first notch.

10. The battery-locking mechanism of claim 9, wherein the fixed end portion of the elastic securing means is received in the first notch.

11. The battery-locking mechanism of claim 10, wherein the free end portion of the elastic securing means is received in the second notch.

12. The battery-locking mechanism of claim 11, wherein a shoulder extends from a bottom of the second notch and the first folded part of the elastic securing means sits on the shoulder.

* * * * *